(12) United States Patent
Kisailus et al.

(10) Patent No.: US 9,666,857 B2
(45) Date of Patent: *May 30, 2017

(54) LOW-TEMPERATURE CONTINUOUS PROCESS TO DERIVE SIZE-CONTROLLED LITHIUM ION ANODES AND CATHODES

(71) Applicant: The Regents of the University of California, Oakland, CA (US)

(72) Inventors: David Kisailus, Riverside, CA (US); Jianxin Zhu, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/648,337

(22) PCT Filed: Nov. 29, 2013

(86) PCT No.: PCT/US2013/072511
§ 371 (c)(1),
(2) Date: May 29, 2015

(87) PCT Pub. No.: WO2014/085784
PCT Pub. Date: Jun. 5, 2014

(65) Prior Publication Data
US 2015/0295226 A1 Oct. 15, 2015

Related U.S. Application Data

(60) Provisional application No. 61/731,771, filed on Nov. 30, 2012.

(51) Int. Cl.
*H01M 4/131* (2010.01)
*H01M 4/1391* (2010.01)
(Continued)

(52) U.S. Cl.
CPC ......... *H01M 4/131* (2013.01); *H01M 4/0419* (2013.01); *H01M 4/1391* (2013.01); *H01M 10/0525* (2013.01)

(58) Field of Classification Search
CPC ...... H01M 4/131; H01M 4/5825; H01M 4/04; H01M 4/1391; H01M 10/0525; B82Y 30/00; B82Y 40/00
See application file for complete search history.

(56) References Cited

U.S. PATENT DOCUMENTS

2002/0195591 A1* 12/2002 Ravet ................. H01B 1/24
252/500
2004/0099092 A1* 5/2004 Harutyunyan ........ B22F 1/0018
75/343

(Continued)

OTHER PUBLICATIONS

Bai, Lingei, International Preliminary Report on Patentability, PCT/US2013/072511, The International Bureau of WIPO, Jun. 11, 2015.

(Continued)

*Primary Examiner* — Brittany Raymond
(74) *Attorney, Agent, or Firm* — Gavrilovich, Dodd & Lindsey LLP

(57) ABSTRACT

The disclosure relates to a process to synthesize nanostructures of a uniform size distribution and/or morphology, nanostructures resulting therefrom, and the use of the nanostructures in energy storage devices.

18 Claims, 1 Drawing Sheet

(51) Int. Cl.
*H01M 10/0525* (2010.01)
*H01M 4/04* (2006.01)

(56) References Cited

U.S. PATENT DOCUMENTS

| | | |
|---|---|---|
| 2008/0292522 A1 | 11/2008 | Kim et al. |
| 2010/0112443 A1 | 5/2010 | Blomgren et al. |
| 2011/0114875 A1 | 5/2011 | Huang et al. |
| 2011/0223359 A1* | 9/2011 | Yang .................. C01B 25/45 |
| | | 427/595 |

OTHER PUBLICATIONS

Shin et al., International Search Report, PCT/US2013/072511, Korean Intellectual Property Office, Mar. 21, 2014.

* cited by examiner

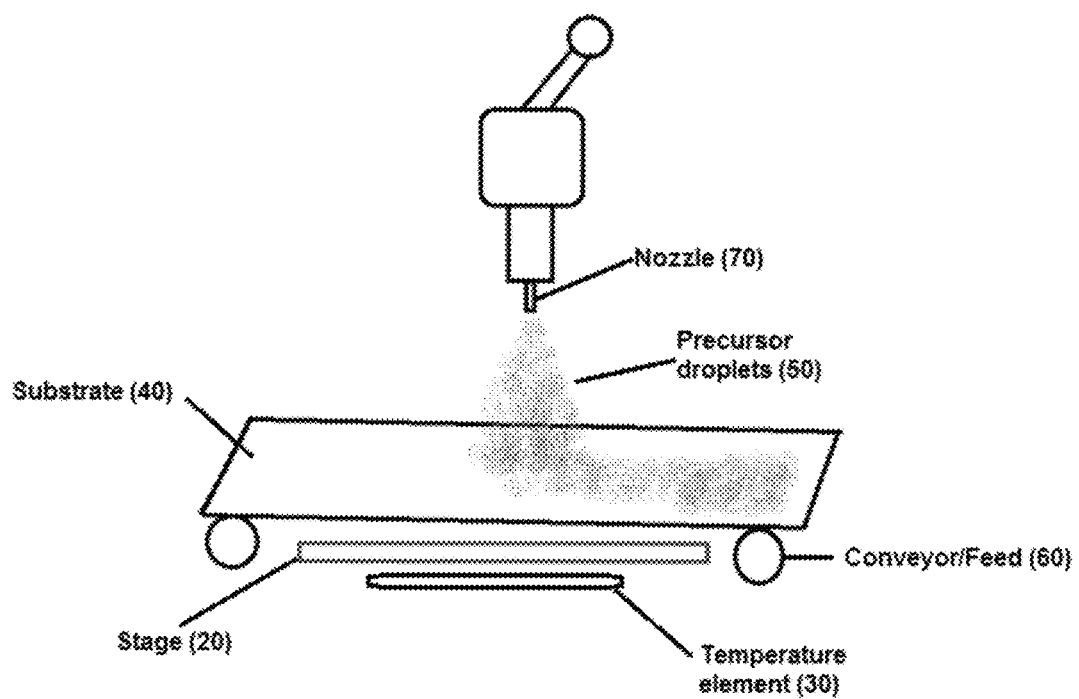

LOW-TEMPERATURE CONTINUOUS PROCESS TO DERIVE SIZE-CONTROLLED LITHIUM ION ANODES AND CATHODES

CROSS REFERENCE TO RELATED APPLICATIONS

This application is a U.S. National Stage Application filed under 35 U.S.C. §371 and claims priority to International Application No. PCT/US2013/072511, filed Nov. 29, 2013, which claims priority to U.S. Provisional Application Ser. No. 61/731,771, filed Nov. 30, 2012, the disclosures of which are incorporated herein by reference.

TECHNICAL FIELD

The invention relates to methods to synthesize nanostructures, such as lithium metal phosphate nanoparticles, and the use thereof in energy storage devices, such as Li-insertion batteries.

BACKGROUND

Methods to make nanoparticles for energy storage devices, such as lithium metal phosphates, use solid-state reactions at high temperatures resulting in nanoparticles that are heterogeneous in size and morphology. These methods, therefore, have to incorporate an additional milling or grinding step in attempts to reduce and make more uniform the nanoparticle size distribution. Non-uniform nanoparticle size and morphology increases stress concentrations and de-stabilizes charge distribution in energy storage devices.

SUMMARY

The disclosure provides a method of synthesizing size and/or morphologically controlled nanostructures comprising depositing a reaction mixture comprising a first metal salt and a second metal salt onto a substrate, wherein the substrate is heated to room temperature or greater for at least 30 seconds, depending upon the temperature and the desired crystal size, under conditions for nucleation and growth of nanostructures on the substrate.

A method of synthesizing size and/or morphologically controlled nanostructures comprising depositing a reaction mixture comprising a first metal salt and a second metal salt onto a substrate, wherein the substrate is heated to room temperature or greater for at least 2 seconds under conditions for nucleation and growth of nanostructures on the substrate. In one embodiment, the reaction mixture is sprayed onto the substrates. In another embodiment, the reaction mixture is formed by mixing a solution comprising a first metal salt with a solution comprising a second metal salt. In yet another embodiment, the method further comprises adjusting the pH of the solution comprising the first metal salt by adding either an acid or base, adjusting the pH of the solution comprising the second metal salt by adding either an acid or base and/or adjusting the pH of the reaction mixture by adding either an acid or base. In yet another embodiment, the method further comprises adding one or more specific polymers to the solution comprising the first metal salt, adding one or more specific polymers to the solution comprising the second metal salt and/or adding one or more specific polymers to the reaction mixture. In yet another embodiment, the first metal salt comprises a transition metal. In a further embodiment, the transition metal selected from the group consisting of manganese, iron, titanium, zinc, copper, cobalt and nickel. In a specific embodiment, the transition metal is iron. In yet another embodiment, the first metal salt comprises a polyatomic anion. In yet a further embodiment, the polyatomic anion is selected from the group consisting of phosphate, sulfate, nitrate, molybdate, oxalates, chlorate, and carbonate. In a specific embodiment, the polyatomic anion is sulfate. In another embodiment, the first metal salt is dissolved in one or more polar solvents. In a further embodiment, the first metal salt is dissolved in water and/or a glycol. In a further embodiment, the first metal salt is dissolved in a mixture of water and triethylene glycol. In another embodiment, the second metal salt comprises lithium. In another embodiment, the second metal salt comprises a polyatomic anion. In a further embodiment, the polyatomic anion is selected from the group consisting of hydroxide, perchlorate, carbonate, diethyl carbonate, tetrafluoroborate, hexaflourophosphate, and triflate. In yet a further embodiment, the polyatomic anion is hydroxide. In another embodiment, the second metal salt is dissolved in one or more polar solvents. In yet a further embodiment, the second metal salt is dissolved in water and/or a glycol. In yet a further embodiment, the second metal salt is dissolved in triethylene glycol. In another embodiment, the concentration of the first metal salt is equal to the concentration of the second metal salt. In another embodiment, the concentration of the first metal salt is greater than the concentration of the second metal salt. In yet another embodiment, the concentration of the first metal salt is less than the concentration of the second metal salt. In another embodiment, the concentration of the first metal salt is at least three times less than the concentration of the second metal salt. In another embodiment, the pH of the solution comprising the first metal salt, the pH of the solution of comprising the second metal salt, and/or the pH of the reaction mixture, is adjusted with either nonaqueous or aqueous acid. In a further embodiment, the pH of the solution comprising the first metal salt is adjusted with nonaqueous polyprotic acid. In still yet a further embodiment, the nonaqueous polyprotic acid is phosphoric acid. In further embodiment, the pH of the reaction mixture is adjusted with aqueous polyprotic acid. In yet a further embodiment, the aqueous polyprotic acid is aqueous sulfuric acid. In another embodiment, the substrate is heated at room temperature or greater for at least 30 seconds. In a further embodiment, the substrate is heated at 50° C. or greater for at least 30 seconds. In yet a further embodiment, the substrate is heated at 100° C. or greater. In still yet a further embodiment, the substrate is heated at 150° C. or greater for at least 30 seconds. In yet a further embodiment, the substrate is heated at a temperature between 150° C. to 200° C. for 30 seconds to 12 hours. In another embodiment, the method produces nanostructures that have a uniform size distribution on the substrate. In a further embodiment, the nanostructures have diameters of less than 100 nm. In another embodiment, the method produces nanostructures deposited on the substrate, wherein the nanostructure have a uniform morphology. In yet a further embodiment, the morphology is selected from the group consisting of nanoparticles, nanobelts, nanocubes, and nanoprisms.

The disclosure also provides an energy storing device comprising nanostructures made by the methods described herein. In one embodiment, the energy storing device is a Li-insertion battery.

BRIEF DESCRIPTION OF FIGURES

The accompanying Figures, which are incorporated into and constitute a part of this specification, illustrate one or more embodiments of the disclosure and, together with the detailed description, serve to explain the principles and implementations of the disclosure.

FIG. 1 shows a general apparatus and system of the disclosure.

DETAILED DESCRIPTION

As used herein and in the appended claims, the singular forms "a," "and," and "the" include plural referents unless the context clearly dictates otherwise. Thus, for example, reference to "a nanostructure" includes a plurality of such nanostructures and reference to "the nanostructures" includes reference to nanostructures resulting from the process and reaction conditions disclosed herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Materials used to make cathodes for lithium insertion batteries comprise large particles that lack homogeneity in size distribution. Current methods to synthesize $LiFePO_4$ particles use solid-state reactions at high temperatures, co-precipitation in aqueous media, hydrothermal synthesis or mechanical-chemical activation. The resulting $LiFePO_4$ particles range in size from the 100's of nanometers in diameter to the 100's of microns in diameter. Such heterogeneity in particle size causes stress to be focused in limited areas, resulting in degrading the mechanical properties of the materials during charge and discharge. The concentration of stress is due to the difference in strain within particles that are partially charged (i.e., particles that are partially filled with Li-ions). Continuous charging and discharging can cause mechanical strain that leads to cracking and eventual failure of cathodes. In addition, the large sizes of cathode particles can lead to extreme charging times and makes the battery use impractical. Using smaller particles can avoid this long charge time, but have lower tap densities (fill densities) that reduce energy density.

The process disclosed herein controls the deposition size and/or shape of the deposited crystals in a facile one-step and continuous process. Traditional lithium-iron phosphate (LFP) materials are synthesized in solid-state reactions at high temperatures, and require co-precipitation in aqueous media, hydrothermal synthesis or mechanical-chemical activation. Since the process disclosed herein is carried out under relatively mild conditions, there is no need for costly capital equipment, waste disposal, and/or labor costs (from time intensive processing).

The method to make nanostructures disclosed herein comprises applying a reaction mixture to a heated substrate. The method comprises preparing a solution comprising a first metal salt with a solution comprising a second metal salt. The method may further comprise one or more pH adjustment steps, polymer addition steps, and/or purification steps. The method disclosed herein, involves dissolving a first metal salt in a solvent, dissolving a second metal salt, combining the dissolved metal salts to form a reaction mixture, and then applying the reaction mixture of a substrates at room temperature or greater and allowing the applied mixture to incubate on the substrates for a sufficient period of time (e.g., from about 2 seconds to several hours; from about 2 seconds to 48 hours, 2-24 hours, 2-10 hours, 5-10 hours, 2-4 hours and any range or numerical value of any of the foregoing). The method disclosed herein, may further comprise steps to adjust the pH of the solutions, steps to add polymers to the solutions or reaction mixture and/or add steps for purifying the resulting nanoparticles. Choice of the solvent/co-solvent systems, addition of specific polymers, and modifying the pH of the solutions, enables size and morphological control of the resulting nanostructures. Using the method disclosed herein, one can obtain lithium-iron phosphate nanocrystals with a controlled range of size and shapes disposed on a substrate. Advantages of the method disclosed herein include, but are not limited to: (i) precise control of the shape and/or size of the deposited nanostructures, (ii) the nanostructures produced can be used in battery cathodes, e.g., batteries with a need for fast charge times and potential for high tap densities, (iii) it is a relatively inexpensive method, and (iv) it can be easily scaled up for industrial production based on the potential for continuous processing.

The size and/or shape of the crystals can be controlled through the synthesis and deposition process disclosed herein comprising dissolving a first metal salt in one or more solvents. In a particular embodiment, the first metal salt comprises a metal that is an alkali metal, alkaline earth metal, transition metal, post-transition metal, or lanthanide. In a further embodiment, the first metal salt comprises a metal that is a transition metal. In a yet further embodiment, the first metal salt comprises a metal selected from the group comprising, manganese, iron, titanium, zinc, copper, cobalt and nickel. In a certain embodiment the first metal salt comprises iron.

In another embodiment, the first metal salt comprises either a polyatomic anion or monoatomic anion. In a further embodiment, the first metal salt comprises a polyatomic anion and/or monoatomic anion selected from the group comprising sulfate, nitrate, phosphate, halide, dihydrogen phosphate, acetate, hydrogen sulfite, hydrogen sulfate, hydrogen carbonate, nitrite, cyanide, hydroxide, permanganate, hypochlorite, chlorate, perchlorate, hydrogen phosphate, oxalate, sulfite, carbonate, chromate, dichromate, silicate, molybdate, phosphite, diethyl carbonate, tetrafluoroborate, hexaflourophosphate, and triflate. In yet another embodiment the first metal salt comprises a polyatomic anion selected from the group comprising phosphate, sulfate, nitrate, molybdate, oxalate, chlorate, and carbonate. In a certain embodiment the first metal salt comprises a polyatomic anion that is either sulfate, or phosphate. In yet another embodiment the first metal salt comprises a polyatomic anion that is a sulfate.

In a particular embodiment, the first metal salt is dissolved in one or more solvents. In another embodiment, the first metal salt is dissolved in one or more polar solvents. In a further embodiment, the first metal salt is dissolved in one or more aqueous and/or non-aqueous solvents. In a further embodiment, the first metal salt is dissolved in one or more polar solvents comprising water, dihydroxy alcohols, alcohols, acetic acid, formic acid, ethyl acetate, tetrahydrofuran, dichloromethane, acetone, acetonitrile, dimethylformamide, dimethyl sulfoxide, and the like. In a further embodiment, the first metal salt is dissolved in mixture of solvents. In yet a further embodiment, the first metal salt is dissolved in water and/or a glycol, such as triethylene glycol (TEG). In a certain embodiment, the first metal salt is dissolved in water and TEG, wherein this water/TEG mixture can range from almost 99.9% water to almost 99.9% TEG with specific volumetric ratios in between depending on desired product.

The size and/or morphology controlled nanostructure synthesis process disclosed herein comprises forming a reaction mixture comprising combining a solution comprising a first metal salt with a solution comprising a second metal salt.

In a certain embodiment, the second metal salt comprises a metal that is an alkali metal, alkaline earth metal, transition metal, post-transition metal, or lanthanide. In a further embodiment, the second metal salt comprises a metal that is an alkali metal. In a certain embodiment, the second metal salt comprises lithium.

In another embodiment, the second metal salt comprises either a polyatomic anion or monoatomic anion. In a further embodiment, the second metal salt comprises a polyatomic anion and/or monoatomic anion selected from the group comprising sulfate, nitrate, phosphate, halide, dihydrogen phosphate, acetate, hydrogen sulfite, hydrogen sulfate, hydrogen carbonate, nitrite, cyanide, hydroxide, permanganate, hypochlorite, chlorate, perchlorate, hydrogen phosphate, oxalate, sulfite, carbonate, chromate, dichromate, silicate, molybdate, phosphite, diethyl carbonate, tetrafluoroborate, hexaflourophosphate, and triflate. In another embodiment, the second metal salt comprises hydroxide, perchlorate, carbonate, diethyl carbonate, tetrafluoroborate, hexaflourophosphate, or triflate. In yet another embodiment the second metal salt comprises a polyatomic anion that is hydroxide.

In a particular embodiment, the second metal salt is dissolved in one or more solvents. In another embodiment, the second metal salt is dissolved in one or more polar solvents. In a further embodiment, the second metal salt is dissolved in one or more aqueous and/or non-aqueous solvents. In a further embodiment, the second metal salt is dissolved in one or more polar solvents comprising water, dihydroxy alcohols, alcohols, acetic acid, formic acid, ethyl acetate, tetrahydrofuran, dichloromethane, acetone, acetonitrile, dimethylformamide, dimethyl sulfoxide, and the like. In a further embodiment, the second metal salt is dissolved in mixture of solvents. In yet a further embodiment, the second metal salt is dissolved in water and/or a glycol, such as triethylene glycol (TEG). In a certain embodiment, the second metal salt is dissolved in water and TEG, wherein this water/TEG mixture can range from almost 99.9% water to almost 99.9% TEG with specific volumetric ratios in between depending on desired product.

The ratio of the concentrations of the first metal salt with that of the second metal salt will primarily dictate the relative size of the nanostructures disclosed herein, wherein the higher the concentration of the first metal salt as it relates to the second metal salt, the smaller the resulting nanostructures. In a particular embodiment, the concentration of the first metal salt is equal to concentration to the second metal salt. In another embodiment, the second metal salt is at a greater concentration than the first metal salt. In a yet further embodiment, the concentration of the second metal salt is at least twice the concentration of the first metal salt. In a yet further embodiment, the concentration of the second metal salt is at least three times the concentration of the first metal salt. In a yet further embodiment, the concentration of the second metal salt is between two times to ten times the concentration of the first metal salt. In another embodiment, the concentration of the first metal salt is greater than the concentration of the second metal salt. In a yet further embodiment, the concentration of the first metal salt is at least two times the concentration of the second metal salt. In a yet further embodiment, the concentration of the first metal salt is at least three times the concentration of the second metal salt. In yet another embodiment, the concentration of the first metal salt is between two times to ten times the concentration of the second metal salt.

The size and/or morphology controlled nanostructure synthesis process disclosed herein comprises a heating step/incubation step, wherein a reaction mixture is deposited (e.g., sprayed) on a substrate that is heated to between about 25° C. and 400° C., wherein the reaction mixture is formed by combining a solution comprising a first metal salt with a solution comprising a second metal salt. In instances where the pH of the reaction mixture is adjusted and/or where one or more specific polymers are added to the reaction mixture, shall be interpreted for the purposes of this section to be included in the term "the reaction mixture." In a certain embodiment, the reaction mixture is applied at room temperature and allowed to incubate on a substrate for at least 2-24 hours. In a certain embodiment, the reaction mixture is applied at least 50° C. and allowed to incubate for at least about 2 hours. In another embodiment, the reaction mixture is applied at about 100° C. and allowed to incubate for at least about 2 hours. In yet another embodiment, the reaction mixture is applied at about 150° C. and allowed to incubate for at least about 2 hours. In a further embodiment, the reaction mixture is applied at about 200° C. and allowed to incubate for at least about 2 hours. In yet a further embodiment, the reaction mixture is applied to a substrate and the substrate is heated (e.g., see FIG. 1).

Using the method of the disclosure, one can control solution conditions (e.g., ions mixed in an aqueous-based solvent with controlled pH, ion concentration) to grow anode and cathode materials (such as $TiO_2$ and $LiFePO_4$) nanostructures on heated templates (either single crystal, polycrystalline or amorphous). The reaction comprises dissolving the appropriate metal and non-metal salts (such as iron sulfate and phosphoric acid) in a solvent (e.g., water/TEG (triethylene glycol)) with $H_2SO_4$ added to control pH and thus, hydration of cations. As mentioned above a dopant cation (e.g., Y, Mn, Co, Ni, etc.) can be added during the mixing of the Li-ion cathode precursor to ensure the dopant is incorporated within the $LiFePO_4$. The precursor (and dopants) solution is then placed in a vessel. A nozzle or other device can be fluidly connected to the vessel and is used to control the rate of deposition (e.g., spraying) and the droplet diameter that impinges on the template/substrate. The template can be heated from 25° C.-400° C. (e.g., 80° C.-200° C.). The deposition, such as by spraying, of this precursor onto the heated template/substrate enables the nucleation and growth on the template/substrate in a controllable manner, producing nanostructures whose crystal size, phase and orientation are dictated both by the solution conditions, heating conditions, and the underlying template/substrate. The resulting product is a solid substrate (e.g., an electrode) with oriented nanostructures growing from its surface (e.g., crystalline nanostructures of $LiFePO_4$) that can be used, for example, in Li-ion batteries. The advantages of this process are that the size, phase and orientation of the nanostructures can be controlled, yielding higher efficiency devices. The three advantages are that (i) the reaction can be scaled and used to produce many different metal oxides, nitrides, sulfides, etc. and (ii) the substrate can be chosen as long as it is stable to the temperature at which nucleation and growth occur (e.g., 25° C.-400° C.), (iii) the solution parameters can be modified to control size and phase of crystals growing on this substrate. This could also be used for solar-based applications.

In a further embodiment, the size and/or morphology can be controlled through the deposition process and through preparation of the reaction mixture. For example, the process disclosed herein can further comprise one or more pH adjustment steps. In a particular embodiment, the pH of a solution comprising a first metal salt, the pH of a solution comprising a second metal salt and/or the pH of the reaction mixture, is adjusted by adding either an acid or base. In another embodiment, the pH of a solution comprising a first metal salt, the pH of a solution comprising a second metal salt and/or the pH of the reaction mixture, is adjusted by adding an acid. In a further embodiment, the pH of a solution comprising a first metal salt, the pH of a solution comprising a second metal salt and/or the pH of the reaction mixture, is adjusted by adding a multiprotic acid. In yet another embodiment, the pH of a solution comprising a first metal salt, the pH of a solution comprising a second metal salt and/or the pH of the reaction mixture, is adjusted by adding an aqueous acid solution. In a further embodiment, the pH of a solution comprising a first metal salt, the pH of a solution comprising a second metal salt and/or the pH of the reaction mixture, is adjusted by adding a nonaqueous and/or aqueous multiprotic acid solution including, but not limited to, phosphoric acid, sulfuric acid, carbonic acid, sulfurous acid, oxalic acid, malonic acid, or hydrogen sulfide acid. In yet a further embodiment, the pH of a solution comprising a first metal salt, the pH of a solution comprising a second metal salt and/or the pH of the reaction mixture, is adjusted with phosphoric acid. In another embodiment, the pH of a solution comprising a first metal salt, the pH of a solution comprising a second metal salt and/or the pH of the reaction mixture, is adjusted with aqueous sulfuric acid.

In a further embodiment, the size and/or morphology can be controlled by use of one or more polymer addition steps. For example, one or more specific polymers (e.g., polyvinyl pyrrolidone, polyacrylic acid) can be added to a solution comprising a first metal salt, a solution comprising a second metal salt and/or to the reaction mixture. In a particular embodiment, one or more polymers are added to the reaction mixture. In addition, the polymer can be modified to one that morphologically controls metals, metal nitrides, metal carbides, etc. The polymer can also be modified to be electrically conducting, allowing the production of electronic and optoelectronic devices.

In a certain embodiment, the size and/or morphology can be controlled by one or more purification steps. Examples of purification steps include but are not limited to, removing solvents by evaporation, removing solvents by drying, filtering, trituration, extraction, sedimentation, size exclusion chromatography, preparative column chromatography, and the like.

The size and/or morphology of the nanostructures disclosed herein can be controlled by varying the water/TEG proportions, as well as, adjusting the pH of the solutions, adding specific polymers, adjusting the ratio of the metals, and the like. Thus, the properties and characteristics of the nanostructures disclosed herein can be tailored by specific reaction conditions. By adjusting such reaction conditions, the nanostructures will change in size and/or morphology.

In a certain embodiment, using the size and/or morphology controlled nanostructure synthesis process disclosed herein results in nanostructures that are uniform in size and/or morphology. In another embodiment, using the process disclosed herein results in LFP nanostructures that are uniform in size and/or morphology. In yet another embodiment, using the process disclosed herein results in nanostructures that are nanoparticles. In a further embodiment, using the process disclosed herein results in nanostructures that are nanoprisms. In yet a further embodiment, using the process disclosed herein results in nanostructures that are nanobelts. In a certain embodiment, using the process disclosed herein results in nanostructures that are nanocubes.

In a particular embodiment, using the size and/or morphology controlled nanostructure synthesis process disclosed herein results in nanoparticles having a near uniform size distribution. In a certain embodiment, using the process disclosed herein results in structures that are less than 100 μM in diameter. In yet another embodiment, using the process disclosed herein results in structures that are less than 10 μM in diameter. In another embodiment, using the process disclosed herein results in nanostructures that are less than 1 μM in diameter. In a certain embodiment, using the process disclosed herein results in nanostructures that are less than 400 nM in diameter. In a further embodiment, using the process disclosed herein results in LFP nanostructures that are less than 100 nM in diameter. In yet a further embodiment, using the process disclosed herein results in LFP nanostructures that are less than 50 nM in diameter.

In a particular embodiment, a nanostructure disclosed herein is LFP nanoprisms of 1 μm×100 nm. In another embodiment, a nanostructure disclosed herein is LFP nanoparticles of 25 nm. In yet another embodiment, a nanostructure disclosed herein is 100 nm LFP nanocubes. In a certain embodiment, a nanostructure disclosed herein is 10 μm×400 nm×20 nm LFP nanobelts.

In another embodiment, one or more devices comprise one or more nanostructures synthesized using the size and/or morphology controlled nanostructure synthesis process disclosed herein. In a further embodiment, one or more devices comprising one or more nanostructures synthesized using the process disclosed herein can be used for energy storage. In yet a further embodiment, one or more devices comprising one or more nanostructures synthesized using the process disclosed herein can be used for Li-insertion batteries. In another embodiment, cathodes for an energy storing device comprise nanostructures synthesized using the process disclosed herein.

As described above and elsewhere herein, the concentration of precursor can vary, from 0.001M-10M, depending on the size and thickness of $LiFePO_4$ desired. To make $LiFePO_4$ nanostructures with this precursor, the typical concentration is 0.1M-1M. The thickness of the film is also determined by the choice of solvent and template, which can be adjusted to make hydrophilic or hydrophobic conditions. Thus, the properties and characteristics of the films can be tailored by the specific reaction conditions. A substrate that is thermally stable to the reaction temperature and pH can be utilized.

The template/substrate can be single, polycrystalline or amorphous metal (or other substrates) that will facilitate electron collection. In fact, the templates could also be metal oxide contact pads that would serve as both templates for $TiO_2$ (or other metal oxide growths) in dye-sensitized solar cells and as source and drain in a device. Thus, devices could be constructed using this method and tested (e.g., resistivity) directly after synthesis.

The reaction temperature does not have to be 80° C.-200° C. although at temperatures less than 80° C., amorphous or non-LiFePO$_4$ phases may result. Also, a minimum of −7° C. should be used to enable the solubility and hydrolysis and condensation of the LiFePO$_4$-precursor.

The reactor can be scaled to smaller or larger volumes, only limited by the cost to manufacture these reactors. These reactions are not limited to LiFePO$_4$ but can include, for example, TiO$_2$ and can be modified with metal nanostructures (Au, Pd, Pt, Ru, Ni, etc.), metal oxide nanostructures (ZnO, Co$_3$O$_4$, ZrO$_2$, RuO$_2$, SnO$_2$, Al$_2$O$_3$), metal nitride (AlN, BN, GaN, InN), or any combination of inorganic compounds (e.g., AlON, InGaN). The solvent does not have to be water+TEG and can be variations thereof. Other non-aqueous based solvents (e.g., alcohols, ethers, etc.) can be utilized to synthesize materials that would otherwise not form under aqueous conditions.

The advantages of this process over existing practices are (i) the one-step processing involved (enabling one step device fabrication using electrode contacts as substrates for cathode or anode deposition), (ii) the low cost (circumventing the need for costly capital equipment, waste disposal, and labor costs (from time intensive processing), (iii) the control over size and phase, (iv) control over crystallographic orientation of the grown nanostructures by the underlying template (substrate) used.

FIG. 1 depicts a device/system of the disclosure for coating a substrate with nanostructure of the disclosure. The system 10 comprises a stage 20 and temperature element(s) 30. The temperature elements are used to heat/cool the stage to a desired temperature. The temperature element 30 can comprise a heat lamp or heating coil or cooling coil or a combination thereof. In some embodiments the temperature element is thermally coupled to the stage 20. The stage 20 can comprise an X-Y stage and may include a motor to move the stage in a Z-direction (not depicted). The stage 20 serves to support a substrate 40 to be coated with nanocrystalline precursor droplets 50. The substrate may be a single sheet or may be part of a continuous feed system on a conveyor belt or other continuous feed system 60. A nozzle 70 is located above the stage 20 so that during operation precursor droplets 50 emitted from the nozzle can impinge on the substrate 40. A reservoir (not depicted) serves to hold the precursor material and is fluidly connected to the nozzle 70.

In operation, the precursor material is mixed as described above and delivered to the reservoir. An inert air supply system delivers pressure to the reservoir to cause the precursor material to be emitted from the nozzle 70 onto the substrate 40. The substrate can be immobile or may be on a continuous feed system. The precursor droplets 50 are emitted from the nozzle 70 at a desired rate to coat the substrate to a desired density and/or thickness. In addition, the emission rate also defines the particle droplet size and is controlled by the delivery rate. The temperature element heats the substrate to a desired temperature to allow for nucleation and growth of nanostructures on the substrate.

Using the methods described herein LiFePO$_4$ tapes can be produced in a continuous process at reduced temperatures. A spray coating technique can be used to continually produce cathode tapes. A precursor solutions is mixed in the proper concentrations (alternatively, LiFePO$_4$ nanoparticles can be suspended) and injected through a spray nozzle operated at varied pressures. A current collector (aluminum or copper sheet) is placed on a heated substrate. The spray is directed on the heated current collector, which enables evaporation of solvent and pyrolysis of precursor, which decomposes and crystallizes to form a continuous thin film of crystalline LiFePO$_4$.

The following Examples present methods and reactions to synthesize the nanostructures of the disclosure. These Examples are presented as generalized guides to make the nanostructures of the disclosure, and should not be interpreted as the definitive process to make the nanostructures of the disclosure. Moreover, variations in the Examples presented below, include, but not limited to, the choice of solvent, choice of metal salts, concentrations of the metal salts, changes in the heating step, changes or removal of the pH adjusting agents, changes or removal of the types and classes of polymers, adding additional purification steps, are not only presented as alternatives in the disclosure but are contemplated as being subsumed in the following Examples.

EXAMPLES

All of the solutions listed herein were mixed under vigorous stirring (~500 rpm) and at ambient temperature.

Process to Synthesis Lithium-Iron Phosphate Nanostructures:

Solution 1: A water soluble iron precursor (iron sulfate (FeSO$_4$.7H$_2$O, concentration from 0.001M-1M) solution was dissolved in a mixture of degassed water and triethylene glycol (TEG), wherein this water/TEG mixture can range from almost 100% water to almost 100% TEG with specific volumetric ratios in between depending on desired product.

Solution 2: An aqueous solution (concentration was 3 times that of the Fe concentration) of LiOH.H$_2$O was prepared and mixed with TEG.

Solution 3: An equimolar (to iron) solution of H$_3$PO$_4$ was then added to Solution 1.

Solution 4: Solution 3 was combined with Solution 2 and the pH was adjusted to a desired level by adding an aqueous solution of H$_2$SO$_4$.

Solution 5: An aqueous solution of a polymer (a variety of polymers can be selected with a specific pendant group to control size and morphological features) was mixed with solution 4.

Solution 6: The pH of solution 5 was adjusted to the desired level by adding an aqueous solution of H$_2$SO$_4$.

Solution 6 was added to a vessel comprising a nozzle and was ejected through the nozzle onto a template/substrate heated to about 120° C.

In yet another embodiment of the methods, lithium hydroxide is dissolved in degassed water (final concentration Li=0.3M). This solution is then added to an equal volume of triethylene glycol (TEG). To this, 0.1M of H$_3$PO$_4$ is added. A ferrous sulfate powder (final concentration 0.1M) is dissolved in the water+TEG+LiOH+H$_3$PO$_4$ solution at room temperature. This reaction is stirred for 30 minutes at 700 rpm. Dilute H$_2$SO$_4$ can be added to modify the pH in order to control the shape of LiFePO$_4$. A single crystal, polycrystalline (often, polycrystalline aluminum) or amorphous substrate (~1 cm×1 cm, although any size can be used) is then placed on a heated plate at 120° C. (between 80° C.-200° C.). The precursor solution is flowed through a pipette, the pipette tip serving as a nozzle. The reaction solution is dripped/sprayed onto the heated substrate. The precursor is then allowed to incubate on the substrate for 1-20 minutes (depending on the temperature) and then cooled.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A method of synthesizing size and/or morphologically controlled nanostructures comprising
mixing a first solution comprising a first metal salt of a transition metal sulfate and a second solution comprising a second metal salt of lithium hydroxide and a third solution comprising a polymer to form a reaction mixture, wherein the first solution and second solution comprise a triethylene glycol and $H_2O$ mixture and the third solution comprises an aqueous buffer;
adjusting the pH of the reaction mixture; and
depositing the reaction mixture onto a substrate, wherein the substrate is heated to room temperature or greater for at least 2 seconds under conditions for nucleation and growth of nanostructures on the substrate.

2. The method of claim 1, wherein the transition metal salt comprises a transition metal selected from the group consisting of manganese, iron, titanium, zinc, copper, cobalt and nickel.

3. The method of claim 2, wherein the transition metal is iron.

4. The method of claim 1, wherein the first solution and second solution comprise one or more polar solvents.

5. The method of claim 1, wherein (a) the concentration of the first metal salt is equal to the concentration of the second metal salt; (b) the concentration of the first metal salt is greater than the concentration of the second metal salt; or (c) the concentration of the first metal salt is less than the concentration of the second metal salt.

6. The method of claim 1, wherein the pH of the reaction mixture is adjusted with nonaqueous polyprotic acid.

7. The method of claim 6, wherein the nonaqueous polyprotic acid is phosphoric acid.

8. The method of claim 1, wherein the pH of the reaction mixture is adjusted with aqueous polyprotic acid.

9. The method of claim 8, wherein the aqueous polyprotic acid is aqueous sulfuric acid.

10. The method of claim 1, wherein the substrate is heated at room temperature or greater for at least 30 seconds.

11. The method of claim 10, wherein the substrate is heated at a temperature between 150° C. to 200° C. for 30 seconds to 12 hours.

12. The method of claim 1, wherein the method produces nanostructures that have a uniform size distribution and/or uniform morphology on the substrate.

13. The method of claim 12, wherein the nanostructures have diameters of less than 100 nm.

14. The method of claim 12, where the morphology is selected from the group consisting of nanoparticles, nanobelts, nanocubes, and nanoprisms.

15. The method of claim 1, wherein the polymer is conductive or non-conductive.

16. The method of claim 1, wherein the polymer is polyvinyl pyrrolidone or polyacrylic acid.

17. An energy storing device comprising nanostructures made by the method of claim 1.

18. The energy storing device of claim 17, wherein the energy storing device is a Li-insertion battery.

* * * * *